United States Patent Office 3,058,936
Patented Oct. 16, 1962

3,058,936
WATERPROOFING EMULSION CONTAINING A HYDROGEN SILICONE AND A CATALYST AND METHOD OF WATERPROOFING THEREWITH
René Leclercq, Woluwe-Saint-Pierre, Belgium, and Jean Colle, Rio de Janeiro, Brazil, assignors to UCB (Union Chimique-Chemische Bedrijven) S.A., Brussels, Belgium, a corporation of Belgium
No Drawing. Filed Sept. 9, 1957, Ser. No. 682,571
Claims priority, application Belgium Sept. 24, 1956
10 Claims. (Cl. 260—29.2)

United States Patent application Ser. No. 646,555, filed March 18, 1957, relates to a water-proofing method for porous materials by means of silicones emulsions containing a catalyst obtained from a titanium compound, a polyol and an amine or alkanolamine.

The present invention relates to a new water-proofing method by means of hydrogen-silicones emulsions containing eventually other silicones. In all cases, the waterproofing compositions contain a catalyst obtained by the method described in patent application 646,555 from a titanium tetrahalide, a polyol and an amine or alkanolamine.

The compositions of the present invention are suitable for application to all porous and fibrous materials such as textiles, leather, paper, board, wood, brickwork, concrete, etc.

According to the invention, the composition contains hydrogen-silicones of the general formula $$R_xH_ySiO_{2-(x+y):2}$$

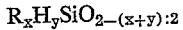

wherein
R is selected from the group consisting of methyl, ethyl, amyl, vinyl and phenyl radicals,
$x+y$ has a value between 1.2 and 2.1
$y:x$ has a value between 0.1 and 5.0

The other silicones which may be present are of the general formula $$R'_2SiO_{2-(z:2)}$$

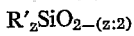

wherein
R' is selected from the group consisting of methyl, ethyl, amyl, vinyl and phenyl radicals
z has a value between 1.2 and 2.1.

The silicones may be resins or oils. In this latter case, the ratios R:Si and R':Si are equal to about 2. The proportions of the silicones used for the preparation of the emulsions may vary within wide limits. There may be used 100% of hydrogen silicones.

The patent application Ser. No. 646,555 relates to the application of emulsions in which no hydrogen-silicones are used.

In order to obtain the emulsions more easily and to insure their stability, it is advised to add emulsifiers. Good results are obtained with "Pluramine S 100," a non-ionic modified fatty acid amide. Others are also suitable.

The catalyst, which lowers the polymerization temperature is prepared according to patent application Ser. No. 646,555. The methods of the patent application Ser. Nos. 605,477 and 605,478, filed August 22, 1956, may also be applied.

The catalyst is obtained by reacting an inorganic titanium compound (for instance titanium tetrachloride) with a polyol such as butanediol-1,3, diethyleneglycol, propanediol and glycerol. The reaction product is then mixed and heated with an alkanolamine such as mono-, di- and triethanolamine, or an amine such as diethylenetriamine cyclohexylamine and morpholine.

The water-proofing emulsion contains (in weight) between 0.5 and 6% of silicones. The percentage of titanium varies within wider limits i.e. from 0.01 to 0.5% of titanium in weight.

The titanium catalyst may be applied to the material to be water-proofed before, during or after the silicones. In the majority of cases it is added to the aqueous emulsion. The application is carried out by very different processes: dipping, sprinkling, pulverization, etc.

The following examples give some compositions prepared according to the invention. These examples concern textiles. However, we repeat that the invention concerns all the porous and fibrous materials.

The examples are made on white cotton previously freed from dressing, rinsed and dried. The specimen is dipped into the water-proofing emulsion and carefully padded for 20 minutes. After centrifuging, the specimen is dried in the air at room temperature and then at 160° C. for 3 minutes 30 seconds.

The specimen is subjected to a water-proofing test by means of the "Spray Tester" described in the standard A.S.T.M. D583 of the American Society for Testing Materials. The water-proofing is determined by a number varying from 100 (substantially complete water-proofing) to 0 (no water-proofing). It is necessary to give a number of additional particulars. The values given were established from the state of the fabric sprinkled for about 30 seconds under standard conditions.

"100": When the fabric has been slightly shaken, only a negligible quantity of water remains on its surface.

"95": During the sprinkling, the water runs in a number of streams. No spots of humidity visible on the fabric. After slight shaking, only a very small quantity of water remains (in the form of well-defined droplets) on the surface of the fabric.

"90–95": During the sprinkling, the water flows in a single stream. No visible wetting of the fabric. After slight shaking, very little water remains visible on the surface of the fabric.

"90": Slight wetting occurs with the formation of from 2 to 5 separate spots. When the fabric has been shaken, a certain quantity of water remains.

"85–90": The water runs in a single stream. No visible wetting of the fabric. When the fabric has been shaken, a fair quantity of water remains on the surface.

"85": Spots due to the wetting remain on the fabric.

"80": Considerable wetting occurs and a great amount of water remains on the fabric.

In order to test the stability of the water-proofing under the action of caustic alkali solutions, the specimen treated as hereinbefore stated is washed for 10 minutes with a hot aqueous solution (90–95° C. containing 5 g. of Marseilles soap and 2 g. of sodium carbonate per liter. After this washing, the specimen is rinsed in running water for 30 minutes. After drying, it is subjected to the water-proofing test in the "Spray Tester."

Several washings are carried out under the same conditions and are always followed by a determination of the water-proofing of the fabric.

The following examples are illustrative only of the invention and should not be construed as limiting the scope thereof and more particularly the compositions which are to be used.

*Example 1*

(a) There is prepared an aqueous solution A by the following method. A mixture of 190 g. titaniumtetrachloride and 270 g. butanediol-(1,3) is heated at 115° C. until a water-soluble mass containing 13% titanium is formed. 177 g. of this mass are mixed with 224 g. triethanolamine and the mixture is heated at 170° C. A water-soluble product containing about 6% titanium is obtained. This product is diluted with water to prepare a solution A containing 7.7 g. titanium per liter.
(b) An emulsion B is prepared from:
Methyl-hydrogen silicone oil having a viscosity of 25 cp. at 20° C. ($CH_3$:H=1.2; ($CH_3$+H):Si=2) _____p__ 23
Methyl silicone resin ($CH_3$:Si=1.5) containing 50% of toluene _____p__ 14
Pluramine S 100 _____p__ 1.5
Water _____p__ 61.5
(c) The water-proofing emulsion contains:
Solution A _____p__ 13.0
Emulsion B _____p__ 6.6
Water _____p__ 80.4
(d) The tests with the "Spray Tester" gave the following results:
After the treatment _____ 100
After the 1st washing _____ 100
After the second washing _____ 100
After the 3rd washing _____ 90–95
After the 4th washing _____ 90–95

*Example 2*

(a) Solution A as in Example 1.
(b) An emulsion C is prepared from:
Methyl-hydrogen silicone resin ($CH_3$:H=1.1; ($CH_3$+H):Si=1.7) containing 80% of toluene _____p__ 23
Methyl silicone resin ($CH_3$:Si=1.5) containing 50% of toluene _____p__ 11.2
Amyl silicone resin ($C_5H_{11}$:Si=1.6) _____p__ 6
Pluramine S 100 _____p__ 1.5
Water _____p__ 58.3
(c) The water-proofing emulsion contains:
Solution A _____p__ 13
Emulsion C _____p__ 6.6
Water _____p__ 80.4
(d) The tests with the "Spray Tester" gave the following results:
After the treatment _____ 100
After the 1st washing _____ 100
After the second washing _____ 100
After the 3rd washing _____ 90–95
After the 4th washing _____ 80

*Example 3*

(a) Solution A as in Example 1.
(b) An emulsion D is prepared from:
Methyl - hydrogen silicone oil having a viscosity of 25 cp. at 20° C. ($CH_3$:H=1.2; ($CH_3$+H):Si=2) _____p__ 18.4
Methyl silicone resin ($CH_3$:Si=1.5) containing 50% of toluene _____p__ 11.2
Vinyl silicone resin ($C_2H_3$:Si=1.6) containing 50% of toluene _____p__ 12
Pluramine S 100 _____p__ 1.5
Water _____p__ 56.9
(c) The water-proofing emulsion contains:
Solution A _____p__ 13
Emulsion D _____p__ 6.6
Water _____p__ 80.4
(d) The tests with the "Spray Tester" gave the following results:
After the treatment _____ 100
After the 1st washing _____ 100
After the 2nd washing _____ 80

*Example 4*

(a) Solution A as in Example 1.
(b) An emulsion E is prepared from:
Methyl-hydrogen silicone oil having a viscosity of 25 cp. at 20° C. ($CH_3$:H=1.2; ($CH_3$+H):Si=2) _____p__ 30
Pluramine S 100 _____p__ 1.5
Methylene chloride _____p__ 10
Water _____p__ 58.5

(c) The water-proofing emulsion contains:
Solution A _____p__ 13
Emulsion E _____p__ 6.6
Water _____p__ 80.4
(d) The tests with the "Spray Tester" gave the following results:
After the treatment _____ 100
After the 1st washing _____ 100
After the 2nd washing _____ 90–95
After the 3rd washing _____ 90–95
After the 4th washing _____ 80

*Example 5*

(a) Solution A as in Example 1.
(b) An emulsion F is prepared from:
Methyl-hydrogen silicone oil having a viscosity of 25 cp. at 20° C. ($CH_3$:H=1.2; ($CH_3$+H):Si=2) _____p__ 10
Amyl-hydrogen silicone resin (H:$C_5H_{11}$=1; ($C_5H_{11}$+H):Si=1.2) containing 50% of toluene _____p__ 20
Methyl silicone resin ($CH_3$:Si=1.5) containing 50% of toluene _____p__ 10
Ethyl silicone oil having a viscosity of 1000 cp. at 20° C. ($C_2H_5$:Si=2.05) _____p__ 5
Pluramine S 100 _____p__ 1.5
Methylene chloride _____p__ 7
Water _____p__ 46.5
(c) The water-proofing emulsion contains:
Solution A _____p__ 19.5
Emulsion F _____p__ 6.6
Water _____p__ 73.9
(d) The tests with the "Spray Tester" gave the following results:
After the treatment _____ 100
After the 1st washing _____ 100
After the 2nd washing _____ 100
After the 3rd washing _____ 90–95
After the 4th washing _____ 85

We claim:
1. Water-proofing emulsion for application to porous and to fibrous materials containing (1) silicone and (2) a catalyst prepared by reacting titanium tetrachloride with a polyhydric alcohol selected from the group consisting of butanediols, propanediols and glycerol and by neutralizing the resulting product by addition of triethanolamine; said silicone comprising: (a) from 5 to 100% of hydrogen silicone of the general formula

$$R_xH_ySiO_{2-(x+y):2}$$

wherein R is selected from the group consisting of methyl, ethyl, amyl, vinyl and phenyl radicals, (x+y) has a value between 1.2 and 2.1, y:x has a value between 0.1 and 5.0; and (b) from 0 to 95% of other silicone of the general formula $$R'_zSiO_{2-(z:2)}$$

wherein R' is selected from the group consisting of methyl, ethyl, amyl, vinyl and phenyl radicals, and z has a value between 1.2 and 2.1.

2. A process for water-proofing porous material which comprises: (I) treating said material with an emulsion containing (1) silicone and (2) a catalyst prepared by reacting titanium tetrachloride with a polyhydric alcohol selected from the group consisting of butanediols, propanediols and glycerol and by neutralizing the resulting product by addition of triethanolamine; said silicone comprising: (a) from 5 to 100% of hydrogen silicone of the general formula $$R_xH_ySiO_{2-(x+y):2}$$

wherein R is selected from the group consisting of methyl, ethyl, amyl, vinyl and phenyl radicals, (x+y) has a value between 1.2 and 2.1, $y:x$ has a value between 0.1 and 5.0; and (b) from 0 to 95% of other silicone of the general formula $$R'_zSiO_{2-(z:2)}$$

wherein R' is selected from the group consisting of methyl, ethyl, amyl, vinyl and phenyl radicals, and $z$ has a value between 1.2 and 2.1 and (II) thereafter drying said material at a temperature of at most 160° C.

3. Water-proofed material obtained by treating porous material with an emulsion containing (1) silicone and (2) a catalyst prepared by reacting titanium tetrachloride with a polyhydric alcohol selected from the group consisting of butanediols, propanediols and glycerol and by neutralizing the resulting product by addition of triethanolamine; said silicone comprising: (a) from 5 to 100% of hydrogen silicone of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.1 and 5.0, and (b) from 0 to 95% of other silicone of the general formula $$R'_zSiO_{2-(z:2)}$$

wherein R' is selected from the group consisting of methyl, ethyl, amyl, vinyl and phenyl radicals, and $z$ has a value between 1.2 and 2.1.

4. Water-proofing emulsion for application to porous and to fibrous materials, said emulsion containing (1) hydrogen silicone and other silicone and (2) a catalyst prepared by reacting titanium tetrachloride with a polyhydric alcohol selected from the group consisting of butanediols, propanediols and glycerol and by neutralizing the resulting product by addition of triethanolamine; said hydrogen silicone constituting at least 5% of the total silicone content and being of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.1 to 5.0; and said other silicone constituting at most 95% of the total silicone content and being of the general formula $$R'_zSiO_{2-(z:2)}$$

wherein R' is selected from the group consisting of methyl, ethyl, amyl, vinyl and phenyl radicals, and $z$ has a value between 1.2 and 2.1.

5. A process for water-proofing fibrous material which comprises: (I) treating said material with an emulsion containing (1) hydrogen silicone and other silicone and (2) a catalyst prepared by reacting titanium tetrachloride with a polyhydric alcohol selected from the group consisting of butanediols, propanediols and glycerol and by neutralizing the resulting product by addition of triethanolamine, said hydrogen silicone constituting at least 5% of the total silicone content and being of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.1 to 5.0; and said other silicone constituting at most 95% of the total silicone content and being of the general formula $$R'_zSiO_{2-(z:2)}$$

wherein R' is selected from the group consisting of methyl, ethyl, amyl, vinyl and phenyl radicals, and $z$ has a value between 1.2 and 2.1 and (II) thereafter drying said material at a temperature of at most 160° C.

6. Water-proofed material obtained by treating fibrous material with an emulsion containing (1) hydrogen silicone and other silicone and (2) a catalyst prepared by reacting titanium tetrachloride with a polyhydric alcohol selected from the group consisting of butanediols, propanediols and glycerol and by neutralizing the resulting product by addition of triethanolamine; said hydrogen silicone constituting at least 5% of the total silicone content and being of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.1 to 5.0; and said other silicone constituting at most 95% of the total silicone content and being of the general formula $$R'_zSiO_{2-(z:2)}$$

wherein R' is selected from the group consisting of methyl, ethyl, amyl, vinyl and phenyl radicals, and $z$ has a value between 1.2 and 2.1.

7. Water-proofing emulsion for application to porous and to fibrous materials containing (1) silicone and (2) a catalyst consisting of the triethanolamine neutralized reaction product of titanium tetrachloride and a polyhydric alcohol selected from the group consisting of butanediols, propanediols and glycerol; said silicone comprising: (a) from 5 to 100% of hydrogen silicone of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.1 and 5.0; and (b) from 0 to 95% of other silicone of the general formula $$R'_zSiO_{2-(z:2)}$$

wherein R' is selected from the group consisting of methyl, ethyl, amyl, vinyl and phenyl radicals, and $z$ has a value between 1.2 and 2.1.

8. A water-proofing emulsion for application to porous and to fibrous materials containing (1) silicone and (2) a catalyst prepared by reacting titanium tetrachloride with a polyhydric alcohol selected from the group consisting of butanediols, propanediols and glycerol and by neutralizing the resulting product by adition of triethanolamine; said silicone consisting of hydrogen silicone of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.- and 5.0

9. A process for water-proofing porous material which comprises treating said material wtih an emulsion containing (1) silicone and (2) a catalyst prepared by reacting titanium tetrachloride with a polyhydric alcohol selected from the group consisting of butanediols, propanediols and glycerol and by neutralizing the resulting product by addition of triethanolamine; said silicone consisting of hydrogen silicone of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.1 and 5.0.

10. Water-proofed material obtained by treating porous material with an emulsion containing (1) silicone and (2) a catalyst prepared by reacting titanium tetrachloride with a polyhydric alcohol selected from the group consisting of butanediols, propanediols and glycerol and by neutralizing the resulting product by addition of triethanolamine; said silicone consisting of hydrogen silicone of the general formula $$R_xH_ySiO_{2-(x+y):2}$$

wherein R is selected from the group consisting of methyl, ethyl, amyl, vinyl and phenyl radicals, $(x+y)$ has a value between 1.2 and 2.1, $y:x$ has a value between 0.1 and 5.0.

References Cited in the file of this patent

UNITED STATES PATENTS

| | | |
|---|---|---|
| 2,588,393 | Kauppi | Mar. 11, 1952 |
| 2,588,365 | Dennett | Mar. 11, 1952 |
| 2,736,721 | Dexter | Feb. 28, 1956 |
| 2,774,690 | Cockett et al. | Dec. 18, 1956 |
| 2,868,750 | Gilkey | Jan. 13, 1959 |